US 11,928,180 B2

(12) United States Patent
Sekar et al.

(10) Patent No.: US 11,928,180 B2
(45) Date of Patent: Mar. 12, 2024

(54) AUTOMATIC GROUND TRUTH SELECTION

(71) Applicant: International Business Machines Corporation, Armonk, NY (US)

(72) Inventors: Deepak Sekar, Chennai (IN); Anil Manohar Omanwar, Pune (IN); Drew Johnson, Cottesloe (AU); Salil Ahuja, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 17/205,734

(22) Filed: Mar. 18, 2021

(65) Prior Publication Data
US 2022/0300756 A1    Sep. 22, 2022

(51) Int. Cl.
*G06F 18/213* (2023.01)
*G06F 9/38* (2018.01)
*G06F 16/9035* (2019.01)
*G06F 16/93* (2019.01)
*G06N 20/00* (2019.01)

(52) U.S. Cl.
CPC .......... *G06F 18/213* (2023.01); *G06F 9/3836* (2013.01); *G06F 16/9035* (2019.01); *G06F 16/93* (2019.01); *G06N 20/00* (2019.01)

(58) Field of Classification Search
None
See application file for complete search history.

(56) References Cited

U.S. PATENT DOCUMENTS

| 6,768,816 B2 | 7/2004 | Hall, Jr. et al. |
| 8,755,595 B1 | 6/2014 | Bissacco et al. |
| 2005/0137723 A1* | 6/2005 | Liu .......................... G09B 7/00 700/45 |
| 2016/0188564 A1* | 6/2016 | Lobez Comeras ... G06F 16/367 704/9 |

(Continued)

OTHER PUBLICATIONS

Boyer et al., "Proceedings of QG2010: The Third Workshop on Question Generation," Open Research Online, The Open University's repository of research publications and other research outputs, http://oro.open.ac.uk/22343/1/QG2010-Proceedings.pdf#page=6, © 2010 The Contributors, 96 pgs.

(Continued)

*Primary Examiner* — Jiangeng Sun
(74) *Attorney, Agent, or Firm* — Kelsey M. Skodje

(57) ABSTRACT

A system, method, and computer program product are disclosed. The method includes receiving a first text unit, extracting features from the first text unit, receiving a second text unit, extracting features from the second text unit, receiving a portion comprising the first text unit and the second text unit, and aggregating the features extracted from the first text unit and the features extracted from the second text unit. The method also includes generating a set of scores for the first text unit, the second text unit, and the portion, and based on the set of scores, selecting at least one ground truth candidate from the first text unit, the second text unit, and the portion. Additionally, the method includes determining that the at least one ground truth candidate includes at least one confirmed ground truth, and adding the at least one confirmed ground truth to a ground truth repository.

20 Claims, 6 Drawing Sheets

(56) References Cited

U.S. PATENT DOCUMENTS

| | | | |
|---|---|---|---|
| 2017/0169355 A1 | 6/2017 | Boyer et al. | |
| 2017/0371955 A1 | 12/2017 | Allen et al. | |
| 2018/0046937 A1 | 2/2018 | Allen et al. | |
| 2018/0082211 A1 | 3/2018 | Allen et al. | |
| 2018/0197530 A1* | 7/2018 | Baughman | G06F 40/247 |
| 2018/0365323 A1* | 12/2018 | Doornenbal | G06F 16/9535 |
| 2019/0026654 A1* | 1/2019 | Allen | G06N 20/00 |
| 2019/0155904 A1 | 5/2019 | Santos Moraes et al. | |
| 2020/0034732 A1* | 1/2020 | Freed | G06N 5/02 |

OTHER PUBLICATIONS

Feigenblat et al., "Unsupervised Query-Focused Multi-Document Summarization using the Cross Entropy Method," https://dl.acm.org/citation.cfm?id=3080690, SIGIR '17: Proceedings of the 40th International ACM SIGIR Conference on Research and Development in Information Retrieval, Aug. 2017, pp. 961-964.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATIC GROUND TRUTH SELECTION

BACKGROUND

The present disclosure relates to identifying ground truth candidates and, more specifically, automatically identifying and sorting ground truth candidates for a text corpus.

Machine learning techniques can be used to extract and process information from text documents. For example, various supervised or unsupervised machine learning models can be applied to creating/updating text corpora, summarizing documents, annotating text, generating text (e.g., generating questions based on information in a document). In order to train a machine learning model, ground truths can be identified. For example, entities and relationships can be identified in a document and annotated according to types. Ground truthing can also be used to refine machine learning models. For example, the accuracy of a model's predictions can be manually evaluated.

SUMMARY

Various embodiments are directed to a system that includes at least one processing component, at least one memory component, a ground truth repository, a document processor, an orchestration module, a feature extractor, a scoring module, and a candidate selector. The document processor is configured to receive text. The orchestration module is configured to determine that the text includes a first text unit, a second text unit; and a portion comprising the first and second text units. The feature extractor is configured to, in response to determining that the text includes the first text unit, extract features from the first text unit. The feature extractor is also configured to, in response to determining that the text includes the second text unit, extract features from the second text unit, and in response to determining that the text includes the portion, aggregate the extracted features. The scoring module is configured to generate a set of scores including at least one score based on the features extracted from the first text unit, at least one score based on the features extracted from the second text unit, and at least one score based on the aggregated features. In some embodiments, the scores are generated in response to the orchestration module determining that the text is complete. The candidate selector is configured to select, based on the set of scores, at least one ground truth candidate from the first text unit, the second text unit, and the portion, determine that the at least one ground truth candidate includes at least one confirmed ground truth, and add the confirmed ground truth to the ground truth repository. The system can also include a question generator configured to generate at least one question based on the at least one ground truth candidate. The set of scores can include at least two scores based on factors such as importance, diversity, and context. The set of scores can also include overall scores upon which the candidate selector can sort the first text unit, second text unit, and portion.

Further embodiments are directed to a method, which includes receiving a first text unit, extracting features from the first text unit, receiving a second text unit, extracting features from the second text unit, receiving a portion comprising the first text unit and the second text unit, and aggregating the features extracted from the first text unit and the features extracted from the second text unit. The method also includes generating a set of scores for the first text unit, the second text unit, and the portion, and based on the set of scores, selecting at least one ground truth candidate from the first text unit, the second text unit, and the portion. Generating the scores can include generating a score based on the features of the first text unit, a score based on the features of the second text unit, and a score based on the aggregated features. In some embodiments, the method includes generating at least one question based on the at least one ground truth candidate. Additionally, the method includes determining that the at least one ground truth candidate includes at least one confirmed ground truth and adding the at least one confirmed ground truth to a ground truth repository. The method can also include receiving additional text units, extracting features from the additional text units, receiving an additional portion that includes the additional text units, and aggregating the features extracted from the additional text units. In some embodiments, the set of scores are based on factors such as importance, diversity, and context. The scores can also include overall scores upon which the first text unit, second text unit, and portion can be sorted. Additionally, generating the scores can include comparing the first text unit, second text unit, and portion to a corpus and generating at least one uniqueness score based on the comparison.

Additional embodiments are directed to a computer program product, which includes a computer readable storage medium having program instructions embodied therewith, the program instructions executable by a processor to cause a device to perform a method. The method includes receiving a first text unit, extracting features from the first text unit, receiving a second text unit, extracting features from the second text unit, receiving a portion comprising the first text unit and the second text unit, and aggregating the features extracted from the first text unit and the features extracted from the second text unit. The method also includes generating a set of scores for the first text unit, the second text unit, and the portion, and based on the set of scores, selecting at least one ground truth candidate from the first text unit, the second text unit, and the portion. Generating the scores can include generating a score based on the features of the first text unit, a score based on the features of the second text unit, and a score based on the aggregated features. In some embodiments, the method includes generating at least one question based on the at least one ground truth candidate. Additionally, the method includes determining that the at least one ground truth candidate includes at least one confirmed ground truth, and adding the at least one confirmed ground truth to a ground truth repository. Further, generating the scores can include comparing the first text unit, second text unit, and portion to a corpus, and generating at least one uniqueness score based on the comparison.

DETAILED DESCRIPTION

Machine learning techniques can be used to extract and process information from text documents. For example, entities and relationships identified in a document can be added to text corpora, used to generate a document summary, etc. Entities and relationships can be annotated according to types and used as ground truths for training a machine learning model. For example, entity types can include locations, job titles, named individuals, occasions, etc. Relationship types indicate relationships between entities (e.g., entity 1 is employed by entity 2). The annotation process is generally carried out manually, at least in part. For example, annotations can be added by subject matter experts (SMEs). Ground truthing can also be used to further refine a machine learning model. For example, SMEs can evaluate the accuracy of a model's output ground truth candidates.

However, manual ground truthing can be tedious, time-consuming, and expensive. Factors affecting the affordability and scalability of manual ground truthing can include the type/level of annotator expertise, number of annotators required, volume of text to be annotated, etc. Therefore, techniques for improving the efficiency of ground truthing are needed.

Disclosed herein are techniques for automatically identifying and sorting ground truth candidates in a text document. The disclosed techniques can be carried out in concert with the text document's creation. For example, when a sentence is entered via a word processor, the sentence can receive a score based on a given set of features. These features can include sentence position, length, importance, context, diversity, etc. Each additional sentence can be scored as it is entered. When a paragraph has been completed, the paragraph can receive a score based on the aggregated features of its constituent sentences.

Based on these scores, ground truth candidates can be selected from the completed document. The candidates can be ranked based on their scores and communicated to a user (e.g., an SME). For example, natural language processing techniques can be used to generate questions based on the ground truth candidates. These questions can be posed to the user, who can then input an answer and/or additional feedback (e.g., a predefined quality rating). The user's contributions can be used to refine a machine learning model. In some embodiments, when the model is sufficiently accurate, it can be used to automatically select ground truths from the identified candidates. The disclosed techniques can save time by allowing SMEs to evaluate preselected/ranked ground truth candidates, rather than locate candidates by reading the entire document. This also reduces the impact of human error on the ground truthing process and can improve the user experience of SMEs.

Figure 1:
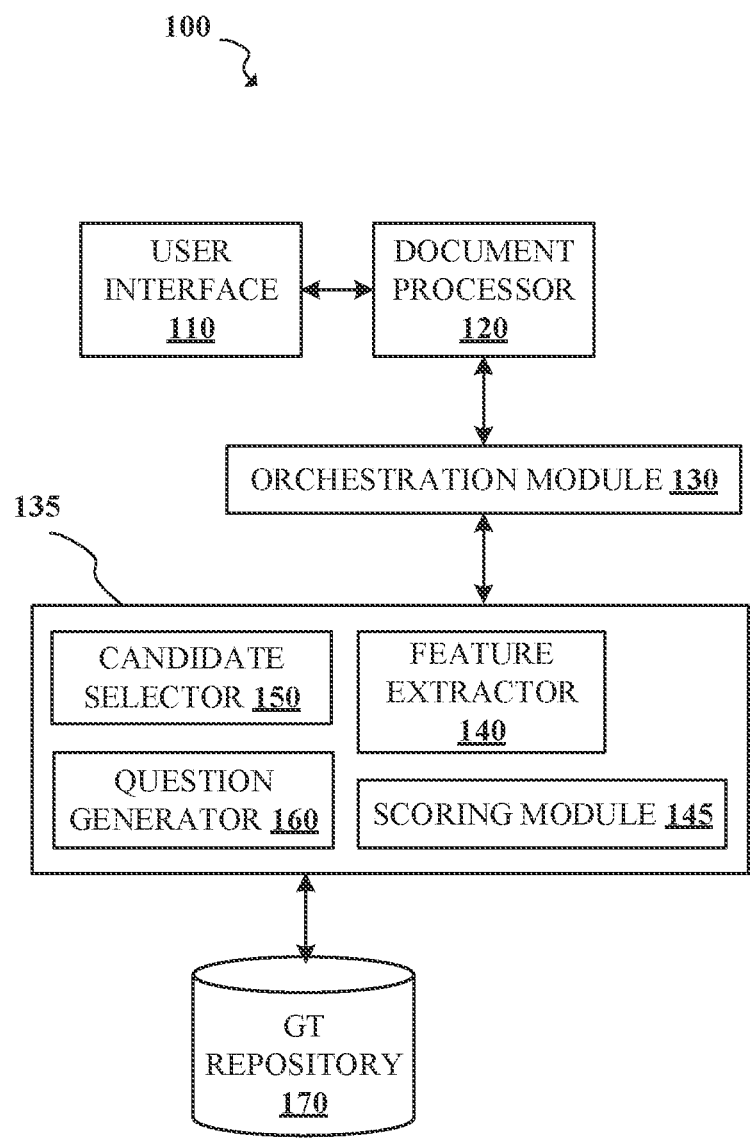
FIG. 1 is a block diagram illustrating a ground truthing environment, according to some embodiments of the present disclosure.

FIG. 1 is a block diagram illustrating a ground truthing environment 100, according to some embodiments of the present disclosure. The ground truthing environment 100 includes a user interface 110; a document processor 120; an orchestration module 130; a ground truth selection component 135; which includes a feature extractor 140, a scoring module 145, a candidate selector 150, a question generator 160; and a ground truth (GT) repository 170.

The document processor 120 can use any appropriate techniques for receiving, displaying, editing, and storing text. For example, the user can enter text, via the user interface 110, into a text editor, word processor program, desktop publishing program, online rich-text editor, a text field in a form (e.g., a hypertext markup language (HTML) form or fillable portable digital format (PDF)), etc. The text can be plain text or formatted text. In some embodiments, the user interface 110 of the document processor 120 can include fields for entering both structured and unstructured data. For example, text can be entered into a field for unstructured text in a form (e.g., an HTML form) that also includes predefined fields for structured data. The text can be input using any appropriate text entry techniques. For example, the text can be typed on a keyboard, converted from recorded speech using a speech-to-text program, digitized from handwriting entered via an active or passive stylus, etc. In some embodiments, structured text data can be input. However, examples herein illustrate ground truthing of unstructured text data.

The orchestration module 130 facilitates ground truthing of a document as the document is created. As the document processor 120 receives the text, the orchestration module 130 can parse the text and identify complete text units such as sentences and paragraphs. While examples herein treat sentences as the smallest extractable text units, other text units may be used (e.g., independent clauses). The orchestration module 130 can also prepare the text for feature extraction using techniques such as tokenization, lowercasing, stopping, stemming, parsing algorithms (e.g., LL parsers, LR parsers, Recursive Descent parsers, Earley parser, Pratt parser, Packrat parser, parser combinators, Shift-reduce parsers, Cocke-Younger-Kasami (CYK) parser, etc.), part-of-speech (POS) taggers, etc. as document text is received. In some embodiments, one or more of the aforementioned text preparation/processing techniques can be carried out by the document processor instead of, or in addition to, the orchestration module 130.

The orchestration module 130 can determine that the document processor 120 has received a complete text unit (e.g., based on punctuation, syntax, semantic analysis, sentence segmentation techniques, etc.). In response, the orchestration module 130 can direct the feature extractor 140 to extract one or more features from the text unit. The features can be concepts, named entities, relationships between entities, keywords, etc. The feature extractor 140 can be trained on existing ground truths in the ground truth repository. For example, features can be identified and extracted using pre-trained recurrent neural networks (RNNs) such as Long Short Term Memory (LSTM) networks or Gated Recurrent Unit (GRU) networks, Hidden Markov models, statistical models, decision tree algorithms, supervised machine learning algorithms, semi-supervised machine learning algorithms, unsupervised machine learning algorithms, text mining, naïve Bayes classifiers, latent semantic indexing, etc.

The orchestration module 130 can also determine when a complete portion of text has been received. Complete portions can be identified based on line breaks, first line indentations, page breaks, section headings or titles, outline or list formatting (e.g., bullet points, letters, numbers, etc.), etc. The type of formatting can vary based on the type of document and portion. For example, a finished paragraph can be identified based on formatting such as a line break or indentation. In some embodiments, the portion can be a section of a document in which each section has a new heading. In these instances, a complete portion may be identified when a new section is begun. Additionally, a user can optionally input an indication that a portion is complete via the user interface 110. When the portion is complete, the orchestration module 130 can direct the feature extractor 140 to aggregate the previously extracted features of the text units in the portion.

The orchestration component 130 can also determine when a document is complete. This can be determined based on user-input information, a predetermined interval passing without the document processor 120 receiving new text, the document being saved or closed, a word limit being reached, a specified formatting change, etc. When the document is complete, the scoring module 145 generates scores for each text unit and portion (e.g., each sentence and paragraph) based a predefined set of factors. In some embodiments, these scoring factors include at least one factor selected from importance, diversity, context, and uniqueness. However, other factors may be used (e.g., sentence length, sentence position, etc.). The features of text units and portions can be compared to the features of the document as a whole in order to calculate the scores. In some embodiments, the text unit and portion features can also be compared to an existing corpus (see below). The following examples refer to scores based on features of text units. However, substantially the same techniques can be used to score text portions based on the aggregated features of multiple text units.

The text units can be scored based on diversity. The scoring module 145 can use cross-entropy summarization, a generic Monte Carlo framework for solving hard combinatorial optimization problems based on rare event estimation, to generate diversity scores. Using cross-entropy summarization, ground truth candidates can be selected based on optimization of a potential summary of the document. The potential summary and document can be represented as Term Frequency-Inverse Document Frequency (TF-IDF) vectors, S and D. Using a bigram language model (LM), diversity can be scored based on the entropy of the potential summary S. Text units that contribute to a potential summary S of the document D having a high entropy (e.g., the highest bigram LM entropy) can receive higher diversity scores because the potential summary covers more aspects of the document than a potential summary with a lower entropy.

Text units can also be scored based on importance, which can be a measure of the number of concepts, extracted by the feature extractor 140, included in a text unit. For example, the sentence, "This device has a great camera and improved battery performance," may receive a higher importance score than "This device has a great camera," because it includes a larger number of concepts (underlined). Using cross-entropy methods, importance can be determined based on the extent to which a potential summary S generally covers the document D. That is, a potential summary containing the largest number of concepts can have the highest importance. Therefore, the scoring module 145 can generate higher importance scores for text units selected for this potential summary.

The scoring module 145 can also score the text units based on context. The same term may be a better ground truth candidate in one context than another. For example, if the document contains clinical notes, the term "running" may refer to a component of a patient's exercise routine. Therefore, the term may be useful in a summary of the document. However, if the document is related to manufacturing, the term "running" may be used frequently to refer to normal operation of equipment. Therefore, the scoring module 145 may generate a higher context-based score for the term "running" when the document contains clinical notes than when the document contains information about manufacturing. The scoring module 145 can use cross-entropy methods and/or any other appropriate machine-learning technique to generate scores based on context.

Additionally, the scoring module 145 can compare the text units with an existing corpus, if available, in order to generate uniqueness scores. In some embodiments, there can be one or more existing corpora in the GT repository 170. Examples of corpora can include, Penn Treebank tag sets, Brown University Standard Corpus of Present-Day American English (Brown Corpus) and Brown family of corpora (e.g., the SUSANNE corpus), Corpus of Contemporary American English, Spoken English Corpus (SEC), Machine-Readable Spoken English Corpus (MARSEC), Aix-MARSEC, Michigan Corpus of Academic Spoken English (MICASE), etc. However, any appropriate digital corpus can be used (e.g., domain-specific corpora (e.g., Unified Medical Language System (UMLS) Metathesaurus, clinical and pathology notes, custom and/or expanded corpora, etc.). Pre-existing corpora can also include languages other than English, such as any machine-readable language. There can also be ground truths selected from the ground truth candidates that are stored in the GT repository 170. This is discussed in greater detail with respect to FIG. 2B.

The scoring module 145 can give text units with greater similarity to text units in an existing corpus lower uniqueness scores. This can help avoid selecting ground truth candidates that are already available and, optionally, stored in the GT repository 170. For example, uniqueness scores can be based on similarity measures such as grammatical similarity algorithms, Jaccard similarity, cosine similarity, Euclidean distance, Language Technology Platform (LTP) of Harbin Institute of Technology, kappa coefficient (K), etc. In instances where there is no available corpus, the uniqueness scores can be omitted.

The scoring module 145 can also generate an overall score for each text unit and portion that takes into account the uniqueness scores as well as the previously calculated factor scores (e.g., importance, context, and diversity scores). In instances where a corpus is not available, the overall scores can be calculated without including uniqueness scores. The scoring module 145 can give each previously calculated score based on individual factors equal weight when calculating the overall score for a sentence. However, in some embodiments, the scoring module 145 can apply different weights to different scores. The weighting of scores when generating the overall scores can depend on the document format, subject matter, user preference, etc.

The candidate selector 150 can sort the sentences in order of overall score and select ground truth candidates from the sentences based on their scores. For example, the candidate selector 150 can select a given number of the highest scoring sentences as ground truth candidates. The number of candidates can vary based on the length of the document, scores of the text units and portions, number of features extracted, user preference, etc. In some embodiments, ground truth candidates are only selected if they have scores greater than a given threshold. In one example, the candidate selector 150 may be configured to select sentences with the ten highest scores. However, if there are only seven sentences with scores above a threshold score, the candidate selector 150 may select those seven sentences as ground truth candidates. In another example, the candidate selector 150 may be configured to select all sentences with scores above a threshold score as ground truth candidates. The number of candidates selected may optionally be adjusted by raising or lowering the threshold in some embodiments.

The question generator 160 can use a seq2seq model to generate questions based on target answers provided by the ground truth candidates. For example, there can be a ground truth candidate such as "Mina traveled by boat to the island."

The question generator 160 can generate a question such as "How did Mina travel to the island?" based on the ground truth candidate. The user's answer can be used to confirm the ground truth candidate. For example, if the user's answer to the aforementioned question is "by boat," the candidate selector 150 can select the candidate as a ground truth. The ground truth can then be added to the ground truth repository 170. However, if the answer does not match, the ground truth candidate can be discarded. In another example, the question generator 160 can generate "Did Mina travel by boat to the island?" based on the preceding ground truth candidate. If the user's answer is "no," the candidate selector 150 can discard the ground truth candidate, but if the user's answer is "yes," the ground truth candidate can be added to the ground truth repository 170.

In other embodiments, the user can evaluate the ground truth candidates without generated questions. In these instances, the user can provide feedback directing the candidate selector 150 to accept or reject a ground truth candidate via the user interface 110.

In some embodiments, the candidate selector 150 can generate a model for automatically selecting ground truths from the ground truth candidates. Based on the model, ground truths can be selected from a document automatically and added to the GT repository 170. Any appropriate machine learning techniques can be used to generate the model (e.g., Random Forests (RF), Support Vector Machine (SVM), Relevance Vector Machines (RVM), Neural Networks (NN), LightGBM, XGBoost, Lasso, etc.). In some embodiments, the candidate selector 150 does not automatically select ground truths until the model performance is above an accuracy threshold. For example, there can be a threshold percentage of ground truth candidates that must be approved by an SME in order for the model to be considered accurate. The accuracy may also be determined by testing the model on training data. For example, the model could be considered accurate if it has an F-score above a given threshold.

Figure 2A:
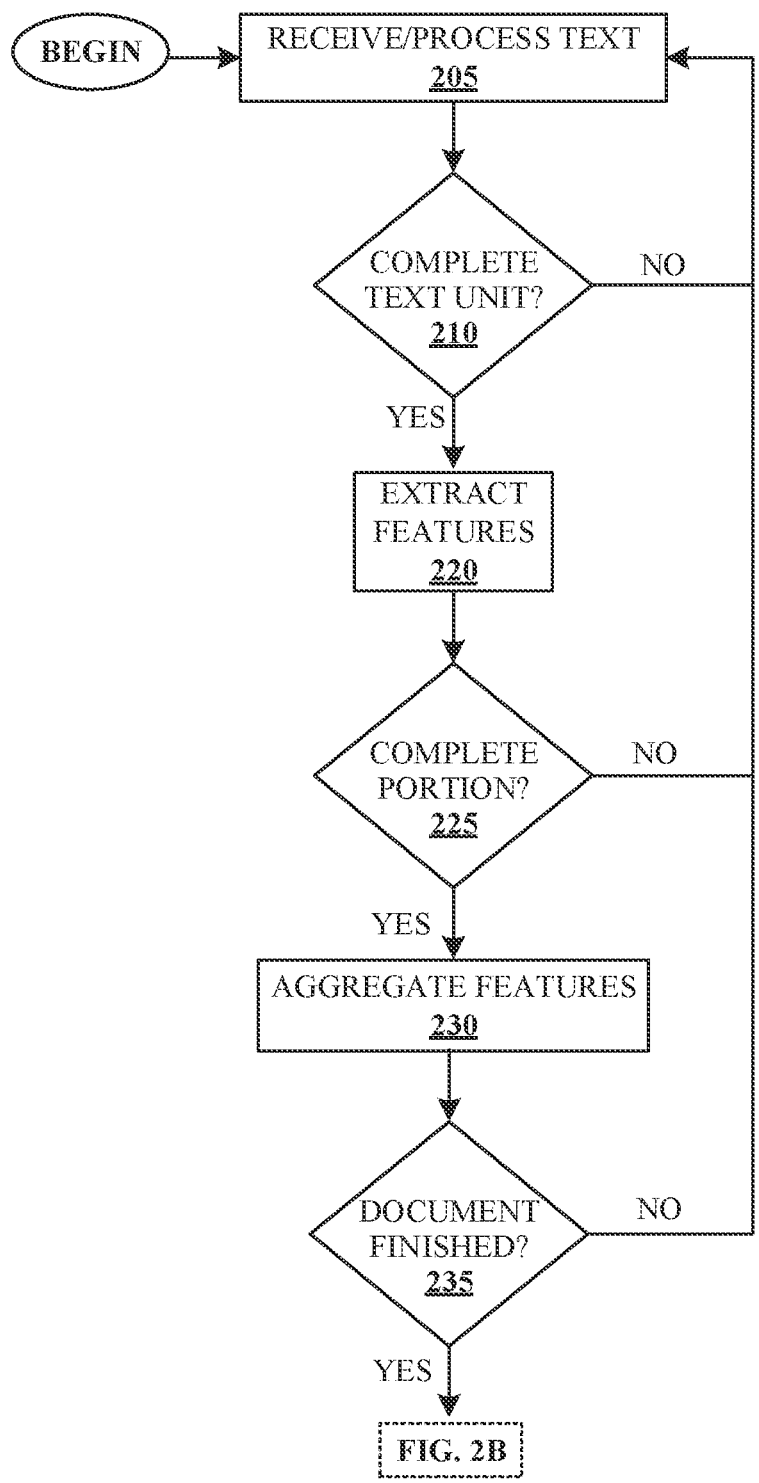
FIGS. 2A and 2B are flow diagrams illustrating a process of ground truthing according to some embodiments of the present disclosure.
Figure 2B:
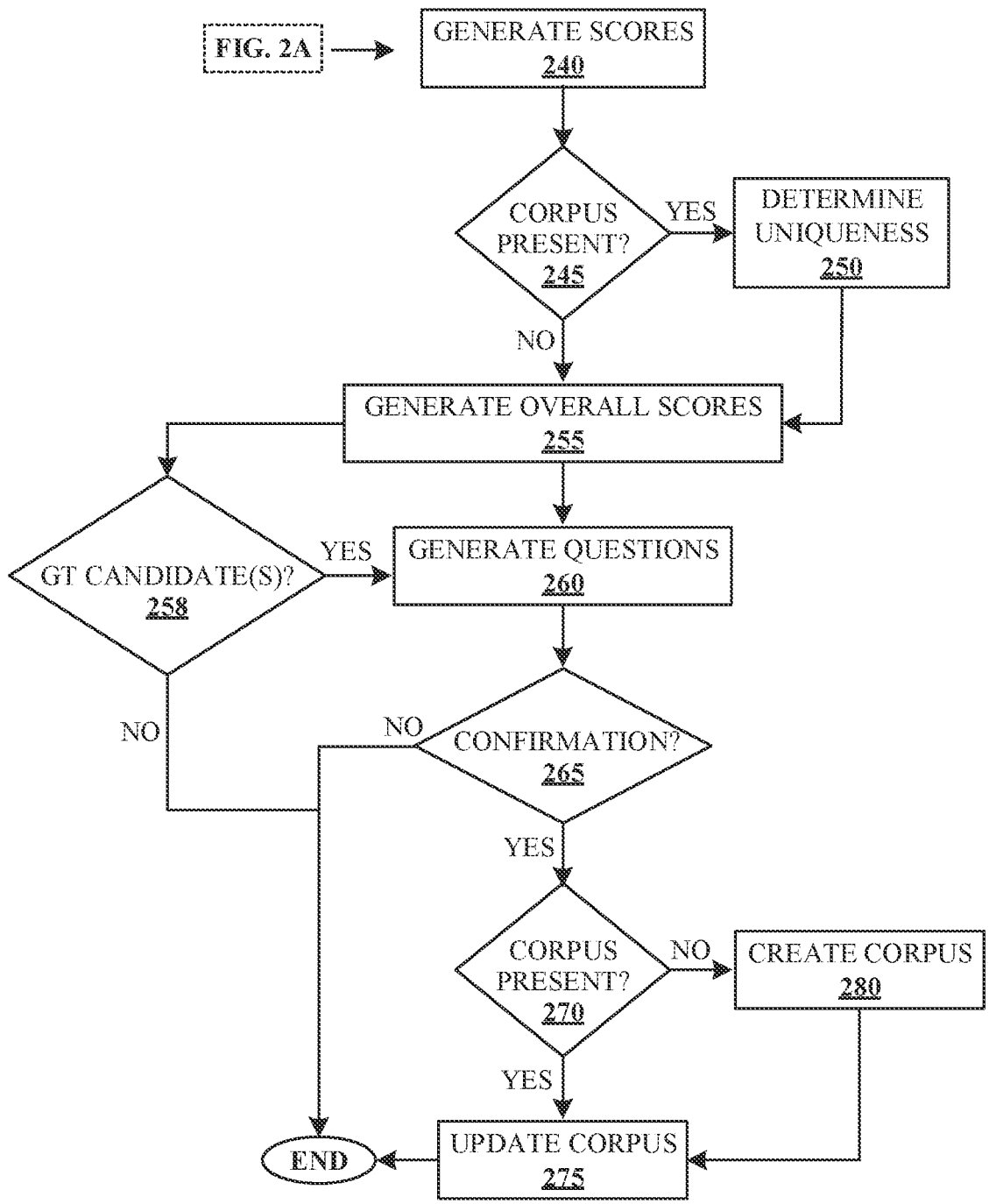

FIGS. 2A and 2B are a flow diagrams illustrating processes 200 and 201 of ground truthing a document, according to some embodiments of the present disclosure. To illustrate processes 200 and 201, but not to limit embodiments, FIGS. 2A and 2B are described within the context of the ground truthing environment 100 of FIG. 1. Where elements referred to in FIGS. 2A and 2B are identical to elements shown in FIG. 1, the same reference numbers are used in each figure.

In process 200 (FIG. 2A), features are extracted from text as a document is created. The document processor 120 receives text, which is then processed. This is illustrated at step 205. A user can enter text into the document processor 120 via the user interface 110. For example, the user can enter text using a text editor, word processor program, desktop publishing program, online rich-text editor, a text field in a form (e.g., an HTML, form or Tillable PDF, etc.). However, the document processor 120 can use any appropriate techniques for receiving, displaying, editing, and storing text in various embodiments. The text can be unstructured plain or formatted text. In other embodiments, the text can include structured text. The text can be processed as it is being entered into the document processor 120. Various text processing techniques can be used, such as parsing algorithms, tokenization, lowercasing, stopping, stemming, POS taggers, etc. The orchestration module 130 can carry out the processing operations. However, in some embodiments, the document processor 120 can carry out at least one text processing operation.

It is then determined whether a complete text unit has been received. This is illustrated at step 210. The orchestration module 130 can identify complete text units in the processed text entered at step 205. The text units are predefined as the smallest extractable text units. The text units can be sentences. However, in some embodiments, other text units may be used (e.g., independent clauses and/or dependent clauses). Complete text units can be detected based on punctuation, syntax, semantic analysis, sentence segmentation techniques, etc. If the orchestration module 130 determines that the received text does not include a complete text unit, process 200 can return to step 205 to receive additional text.

However, if it is determined that a complete text unit has been received, the feature extractor 140 can extract features from the complete text unit. This is illustrated at step 220. For example, features can be identified and extracted using pre-trained recurrent neural networks (RNNs) such as Long Short Term Memory (LSTM) networks or Gated Recurrent Unit (GRU) networks, Hidden Markov models, statistical models, decision tree algorithms, supervised machine learning algorithms, semi-supervised machine learning algorithms, unsupervised machine learning algorithms, text mining, naïve Bayes classifiers, latent semantic indexing, etc. The features can be nouns, noun phrases, entities, relationships, keywords, concepts, punctuation, formatting, etc.

It is then determined whether a complete text portion has been received. This is illustrated at step 225. Techniques for identifying a complete portion (e.g., a paragraph) are discussed in greater detail with respect to FIG. 1. If the orchestration module 130 determines that the received text does not include a complete text portion, process 200 can return to step 205 to receive additional text. However, if a complete portion is identified, features of its constituent text units can be aggregated. This is illustrated at step 230. These features are features previously extracted from each text unit in the complete portion at step 220. For example, the extracted features of sentences in a complete paragraph can be aggregated to form a set of features for the paragraph.

It is then determined whether the document is complete. This is illustrated at step 235. For example, there can be a user-input instruction stating that the document is complete. Techniques for determining that the document is complete are discussed in greater detail with respect to FIG. 1. If the orchestration module 130 does not determine that the document is complete, process 200 can return to step 205 to receive additional text. However, if the document is determined to be complete at step 235, process 201 can begin. Process 201 is illustrated in FIG. 2B.

In process 201, ground truths are identified based on the features extracted from the document in process 200 (FIG. 2A). Scores are generated for the text units and portions. This is illustrated at step 240. Scores for at least one predetermined factor are generated by the scoring module 145 based on the features extracted and aggregated at steps 220 and 225 of process 200. The scores for text units are based on their extracted features, and the scores for portions are based on the aggregated features of their constituent text units. The scoring factors can be related to optimization of a document summary. For example, text units and portions can have higher scores if they have features covering important or diverse aspects of the document (e.g., via cross-entropy summarization methods). This is discussed in greater detail with respect to FIG. 1. In addition to factors such as importance and diversity, the text units and portions can be scored based on context (e.g., topic or function of document). In some embodiments, other scores (e.g., sentence length, sentence position, etc.) can be generated at step 240 as well.

It can then be determined whether an existing corpus is available for comparison. This is illustrated at step 245. If a corpus is available, the features of the text units and portions can be compared to the corpus in order to generate uniqueness scores. This is illustrated at step 250. In some embodiments, there can be more than one corpus used for comparison. The corpus or corpora can be stored in the ground truth repository 170 in some embodiments. The scoring module 145 can generate uniqueness scores for the text units and portions based on similarity measures used for the comparison. This is discussed in greater detail with respect to FIG. 1. Text units and portions having features similar to features in the corpus can receive lower uniqueness scores.

When step 250 is complete, or if no corpus is found at step 245, overall scores can be generated for the text units and portions. This is illustrated at step 255. At step 255, the scoring module 145 can generate overall scores for the text units and portions based on the scores generated at step 240 and, in some embodiments, step 250. For example, the scoring module 145 can generate an overall score for a text unit by combining scores for importance, diversity, context, and, if available, uniqueness. In some embodiments, the scores may be weighted when generating an overall score. This is discussed in greater detail with respect to FIG. 1. It is noted that, in some embodiments, step 245 can be optionally omitted, in which case process 201 can proceed directly from step 240 to 255. In these instances, the overall score will not include a uniqueness score based on comparison with a corpus.

It is then determined whether there are ground truth candidates in the text units and portions. This is illustrated at step 258. The candidate selector 150 can sort the text units and portions based on their overall scores. In some embodiments, the candidate selector 150 selects a given number or percentage of the text units and/or portions having the highest scores to be ground truth candidates. With these ground truth candidates selected, process 201 can proceed to step 260 (see below). However, in some embodiments, the candidate selector 150 may select ground truth candidates only from text units/portions having scores above a predetermined threshold score. If no ground truth candidates have scores above the threshold, process 201 can end. However, if at least one text unit and/or portion has a score above the threshold score, process 201 can proceed to step 260.

Questions can be generated based on the selected ground truth candidates. This is illustrated at step 260. The questions can be generated using a seq2seq model based on answers targeting the ground truth candidates. However, other natural language processing and deep learning techniques may be used in some embodiments. The questions can be viewed by a user via the user interface 110. However, in some embodiments, the ground truth candidates can be viewed at step 260 instead of, or in addition to, generated questions.

It is then determined whether a ground truth candidate is confirmed as a ground truth by the user. This is illustrated at step 265. The user can confirm one or more ground truth candidates using various indicators. In some embodiments, an answer to a question generated at step 260 can be a confirmation. For example, at least one ground truth candidate may be selected from the sentence "Patient A underwent Procedure B to treat Condition C." Questions generated from this candidate at step 260 may include one or more of: "Was Procedure B used to treat Condition C?", "Did Patient A have condition C?", "Did patient A undergo Procedure B?", etc. The user can also select ground truth candidates that they wish to confirm without answering generated questions in some embodiments. For example, the ground truth candidates can be highlighted or otherwise annotated text in the document. In these instances, the user can select which candidates they wish to confirm as ground truths. If the user does not confirm any of the ground truth candidates, process 201 can end. However, if at least one ground truth candidate is selected as a confirmed ground truth, process 201 can proceed to step 270.

At step 270, it is determined whether there is an existing corpus of ground truths available. For example, the ground truth repository 170 can include a corpus of ground truths. If there is an available corpus, the candidate selector 150 can update the existing corpus with the confirmed ground truth(s). This is illustrated at step 275. However, if no existing corpus is available, the candidate selector 150 can create a corpus in the ground truth repository 170. This is illustrated at step 280. Process 201 then proceeds to step 275, whereupon the confirmed ground truths are added to the corpus created at step 280. Process 201 can then end. However, processes 200 and 201 can be repeated if additional text units/portions are added to the document, or if another document is created. In these instances, the ground truth repository 170 containing previously confirmed ground truths can be updated at step 275.

Figure 3:
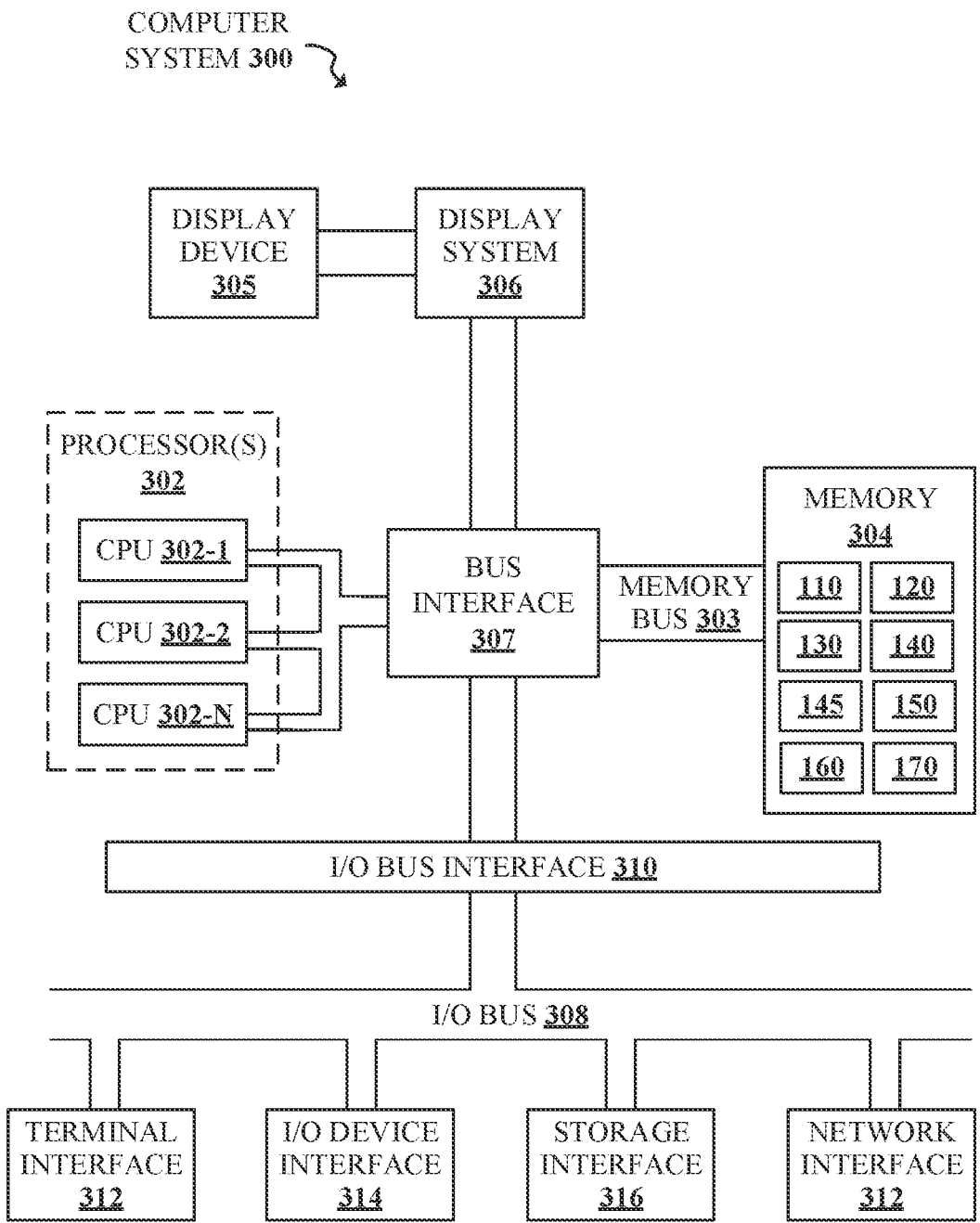
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300 and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The user interface 110, document processor 120, orchestration module 130, feature extractor 140, scoring module 145, candidate selector 150, question generator 160, and GT repository 170 (FIG. 1) are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the user interface 110, document processor 120, orchestration module 130, feature extractor 140, scoring module 145, candidate selector 150, question generator 160, and GT repository 170 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the user interface 110, document processor 120, orchestration module 130, feature extractor 140, scoring module 145, candidate selector 150, question generator 160, and GT repository 170 include instructions that execute on the processor 302 or instructions that are interpreted by instructions that execute on the processor 302 to carry out the functions as further described in this disclosure. In another embodiment, the user interface 110, document processor 120, orchestration module 130, feature extractor 140, scoring module 145, candidate selector 150, question generator 160, and GT repository 170 are implemented in hardware via semiconductor devices, chips, logical gates, circuits, circuit cards, and/or other physical hardware devices in lieu of, or in addition to, a processor-based system. In another embodiment, the user interface 110, document processor 120, orchestration module 130, feature extractor 140, scoring module 145, candidate selector 150, question generator 160, and GT repository 170 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
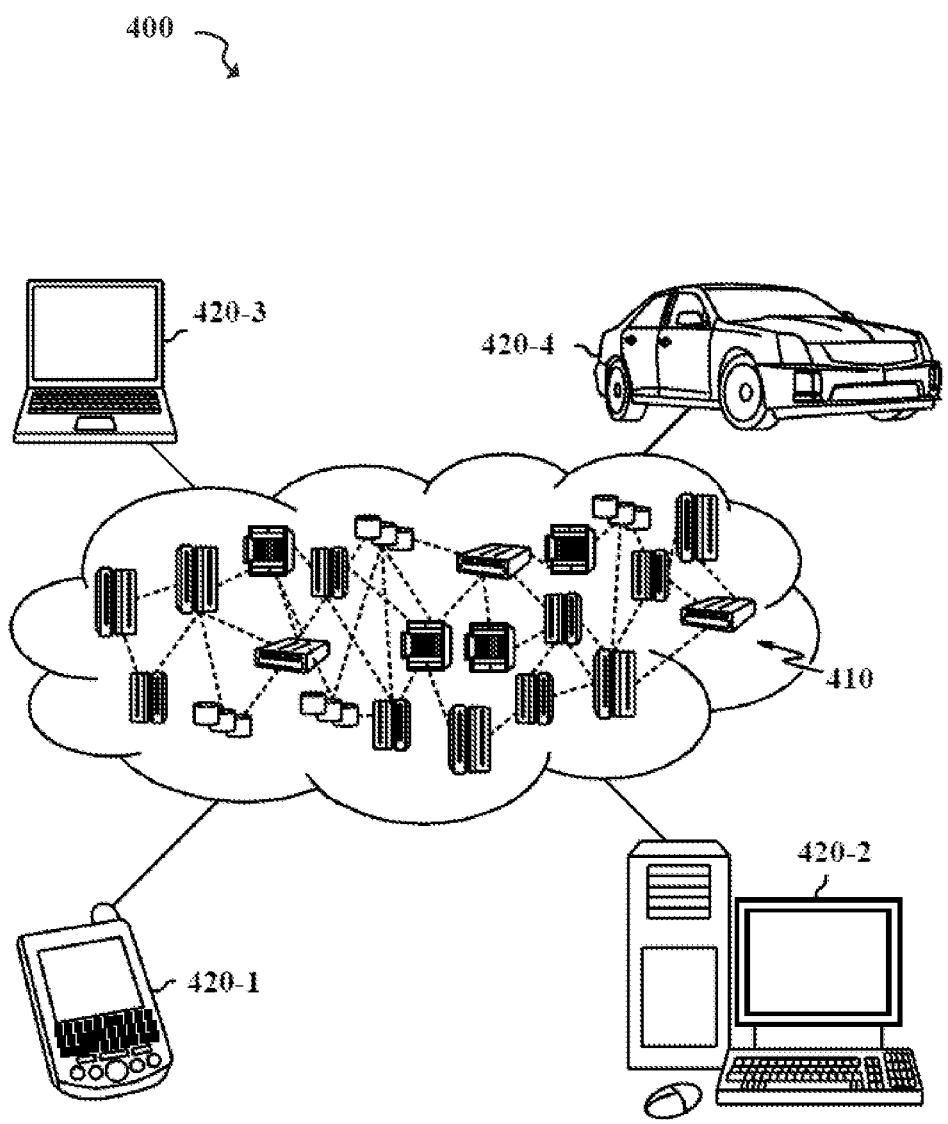
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
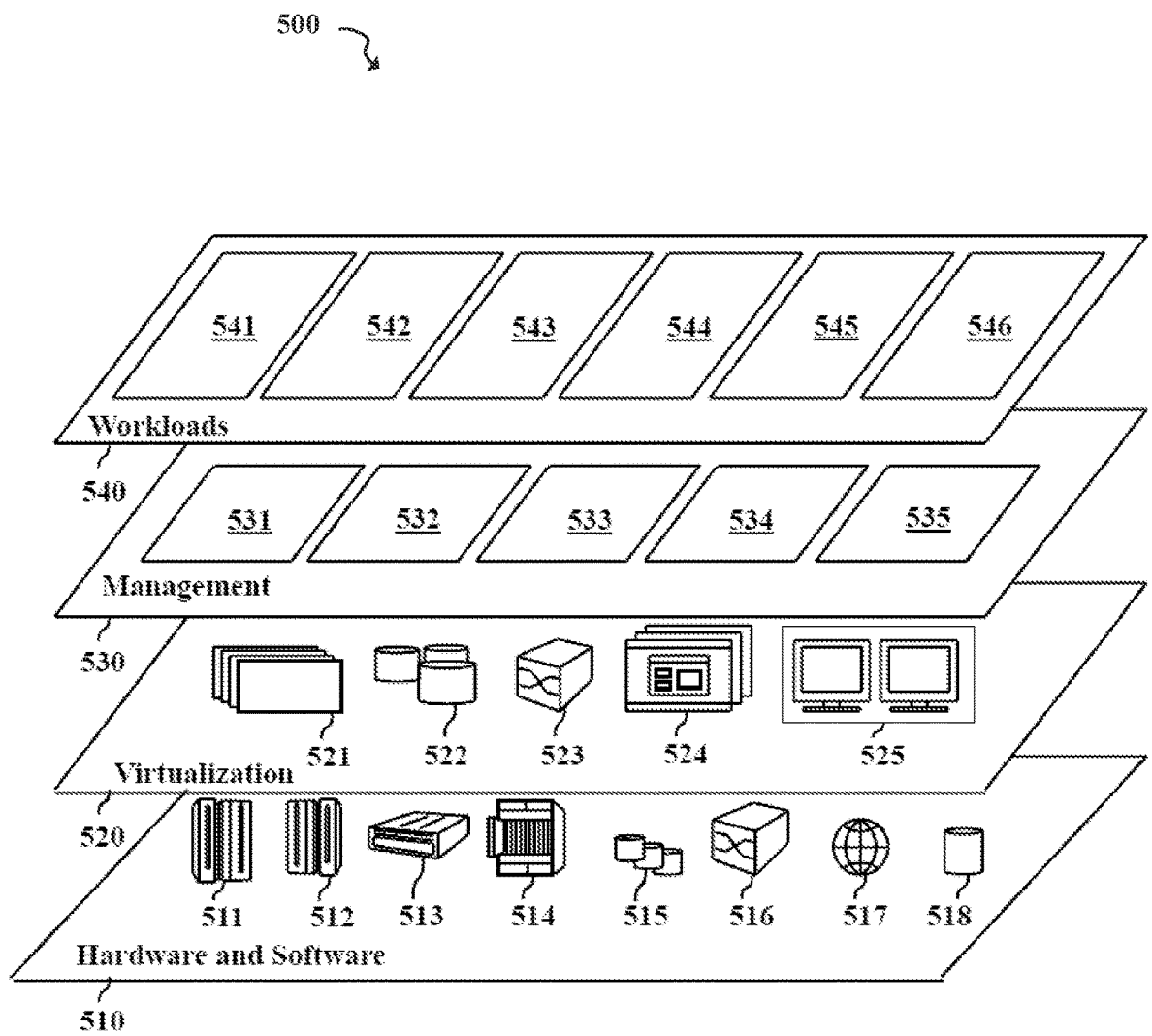
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and ground truthing 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
   at least one processing component;
   at least one memory component;
   a ground truth repository;
   a document processor configured to receive text;
   an orchestration module configured to:
      determine that the text includes a first text unit;
      determine that the text includes a second text unit; and
      determine that the text includes a portion comprising the first and second text units;
   a feature extractor, configured to:
      in response to the determining that the text includes the first text unit, extract features from the first text unit;
      in response to the determining that the text includes the second text unit, extract features from the second text unit; and
      in response to the determining that the text includes the portion, aggregate the features extracted from the first and second text units;
   a scoring module, configured to:
      generate a set of scores, comprising:
         at least one score based on the features extracted from the first text unit;
         at least one score based on the features extracted from the second text unit; and
         at least one score based on the aggregated features; and
   a candidate selector, configured to:
      select, based on the set of scores, at least one ground truth candidate from the first text unit, the second text unit, and the portion;
      determine that the at least one ground truth candidate includes at least one confirmed ground truth, wherein the determining comprises:
         providing a question generated by a question generator based on the at least one ground truth candidate; and
         receiving, from a user, an answer to the question, wherein the answer confirms the ground truth; and
      add the confirmed ground truth to the ground truth repository.

2. The system of claim 1, wherein the set of scores comprises at least two scores based on factors independently selected from the group consisting of importance, diversity, and context.

3. The system of claim 1, wherein the set of scores comprises overall scores for each of the first text unit, the second text unit, and the portion.

4. The system of claim 3, wherein the candidate selector is further configured to sort the first text unit, the second text unit, and the portion based on the overall scores.

5. The system of claim 1, wherein the orchestration module is further configured to determine that the text is complete.

6. The system of claim 5, wherein the scoring module generates the set of scores in response to the determining that the text is complete.

7. The system of claim 1, wherein the question is generated using a seq2seq model.

8. A method, comprising:
   receiving a first text unit;
   extracting features from the first text unit;
   receiving a second text unit;
   extracting features from the second text unit;
   receiving a portion, the portion comprising the first text unit and the second text unit;
   aggregating the features extracted from the first text unit and the features extracted from the second text unit;
   generating a set of scores for the first text unit, the second text unit, and the portion;
   selecting, based on the set of scores, at least one ground truth candidate from the first text unit, the second text unit, and the portion;
   generating a question based on the at least one ground truth candidate;
   receiving, from a user, an answer to the question;
   determining, based on the answer, that the at least one ground truth candidate includes at least one confirmed ground truth; and
   adding the at least one confirmed ground truth to a ground truth repository.

9. The method of claim 8, further comprising:
   receiving at least two additional text units;
   extracting features from each of the at least two additional text units;
   receiving an additional portion comprising the at least two additional text units; and
   aggregating the extracted features from the at least two additional text units.

10. The method of claim 8, wherein the set of scores comprises at least two scores based on factors independently selected from the group consisting of importance, diversity, and context.

11. The method of claim 8, wherein generating at least one score from the set of scores comprises:
   comparing the first text unit, the second text unit, and the portion to a corpus; and
   generating, based on the comparing, at least one uniqueness score.

12. The method of claim 8, wherein the generating the set of scores comprises:
   generating at least one score based on the features extracted from the first text unit;
   generating at least one score based on the features extracted from the second text unit; and
   generating at least one score based on the aggregated features.

13. The method of claim 12, wherein the set of scores includes overall scores for each of the first text unit, the second text unit, and the portion.

14. The method of claim 13, further comprising sorting the first text unit, the second text unit, and the portion based on the overall scores.

15. The method of claim 8, further comprising receiving, from the user, a quality rating for the question.

16. The method of claim 8, further comprising refining a machine learning model using the ground truth repository.

17. A computer program product, the computer program product comprising a computer readable storage medium having program instructions embodied therewith, the program instructions executable by a processor to cause a device to perform a method, the method comprising:
- receiving a first text unit;
- extracting features from the first text unit;
- receiving a second text unit;
- extracting features from the second text unit;
- receiving a portion, the portion comprising the first text unit and the second text unit;
- aggregating the features extracted from the first text unit and the features extracted from the second text unit;
- generating a set of scores for the first text unit, the second text unit, and the portion;
- selecting, based on the set of scores, at least one ground truth candidate from the first text unit, the second text unit, and the portion;
- generating a question based on the at least one ground truth candidate;
- receiving, from a user, an answer to the question;
- determining, based on the answer, that the at least one ground truth candidate includes at least one confirmed ground truth; and
- adding the at least one confirmed ground truth to a ground truth repository.

18. The computer program product of claim 17, wherein the generating the set of scores comprises:
- generating at least one score based on the features extracted from the first text unit;
- generating at least one score based on the features extracted from the second text unit; and
- generating at least one score based on the aggregated features.

19. The computer program product of claim 17, wherein the set of scores comprises at least two scores based on factors independently selected from the group consisting of importance, diversity, context, and uniqueness.

20. The computer program product of claim 17, wherein generating at least one score from the set of scores comprises:
- comparing the first text unit, the second text unit, and the portion to a corpus; and
- generating, based on the comparing, at least one uniqueness score.

* * * * *